United States Patent
Labisch

(10) Patent No.: US 12,449,036 B2
(45) Date of Patent: Oct. 21, 2025

(54) DEVICE FOR TENSIONING A STUFFING BOX PACKING

(71) Applicant: BHS-Sonthofen GmbH, Sonthofen (DE)

(72) Inventor: Wolfgang Labisch, Sonthofen (DE)

(73) Assignee: BHS-Sonthofen GmbH, Sonthofen (DE)

( * ) Notice: Subject to any disclaimer, the term of this patent is extended or adjusted under 35 U.S.C. 154(b) by 6 days.

(21) Appl. No.: 18/698,477

(22) PCT Filed: Oct. 12, 2021

(86) PCT No.: PCT/EP2021/078163
§ 371 (c)(1),
(2) Date: Apr. 4, 2024

(87) PCT Pub. No.: WO2023/061560
PCT Pub. Date: Apr. 20, 2023

(65) Prior Publication Data
US 2025/0237309 A1 Jul. 24, 2025

(51) Int. Cl.
*F16J 15/18* (2006.01)

(52) U.S. Cl.
CPC ........... *F16J 15/185* (2013.01); *F16J 15/184* (2013.01)

(58) Field of Classification Search
CPC ............................. F16J 15/184; F16J 15/185
See application file for complete search history.

(56) References Cited

U.S. PATENT DOCUMENTS 2,518,980 A * 8/1950 Early .................. B63H 23/36
277/520
2020/0309264 A1* 10/2020 Kienle ................. F16J 15/184

FOREIGN PATENT DOCUMENTS

DE 4318157 A1 12/1994
WO 9428336 A1 12/1994

OTHER PUBLICATIONS

International Application No. PCT/EP2021/078163, International Search Report and Written Opinion mailed Jun. 13, 2022, 11 pages.

* cited by examiner

Primary Examiner — Nicholas L Foster
(74) Attorney, Agent, or Firm — Kilpatrick Townsend & Stockton LLP

(57) ABSTRACT

Disclosed is a device for tensioning a stuffing box packing which abuts against a superordinate assembly which is to be sealed by the stuffing box packing and which, such as the stuffing box packing, does not belong to the tensioning device. The device comprises a stuffing box gland, which is designed and intended to abut against a free side of the stuffing box packing, and a plurality of tensioning elements, which are designed and intended to press the stuffing box gland against the stuffing box packing and thus the stuffing box packing against the superordinate assembly. A separate motor drive unit is associated with each of the tensioning elements.

19 Claims, 9 Drawing Sheets

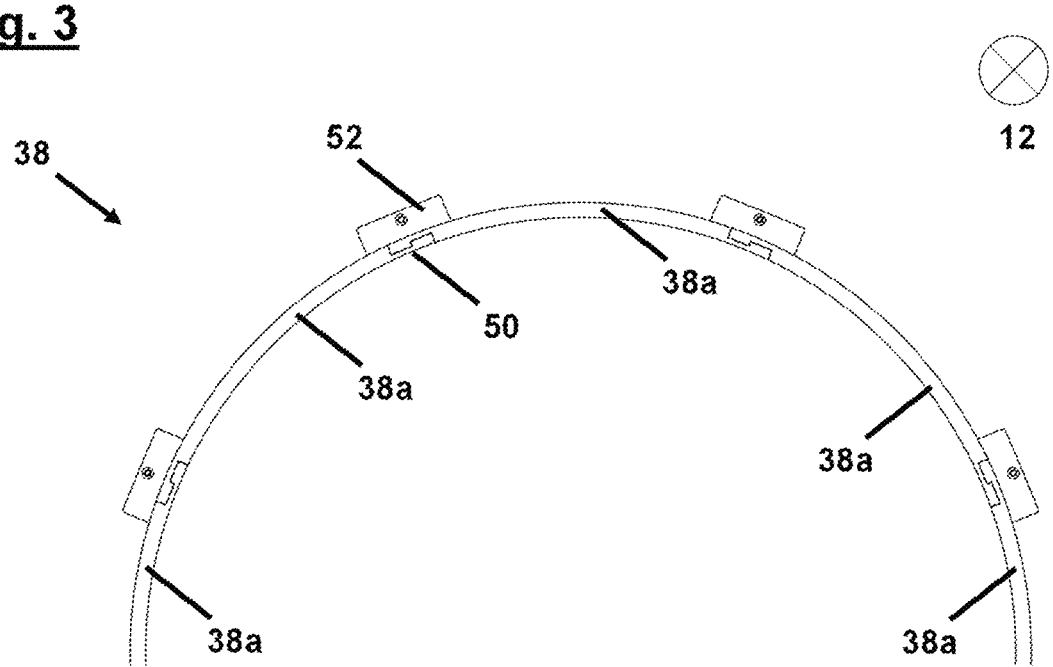

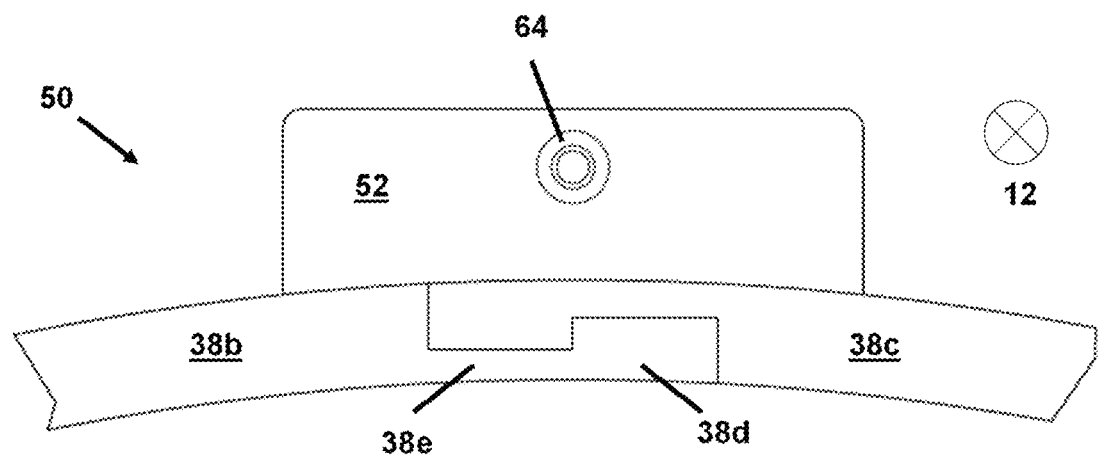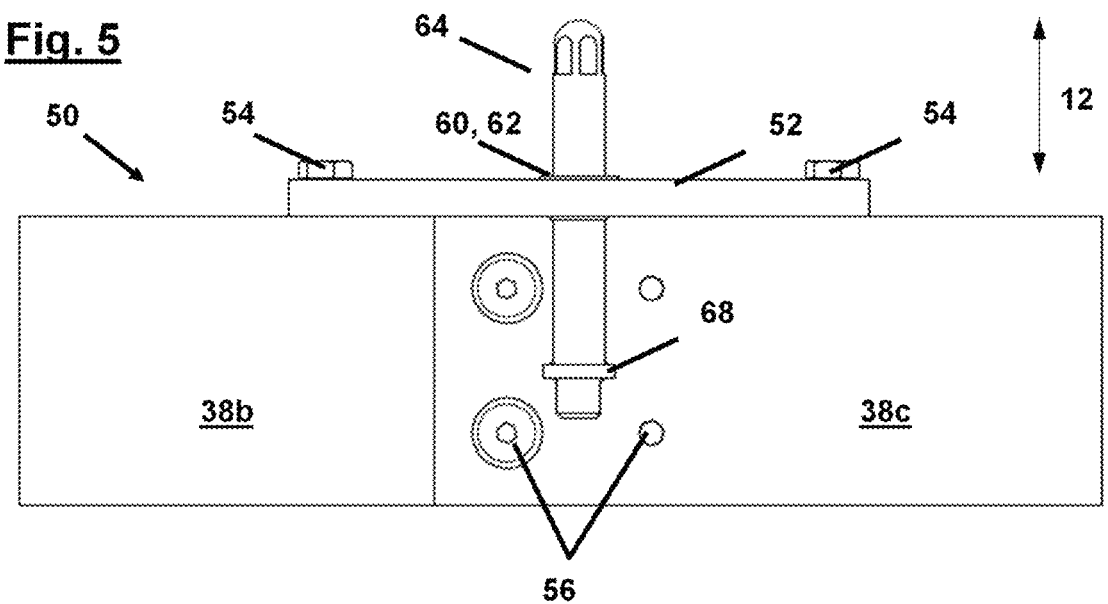

DEVICE FOR TENSIONING A STUFFING BOX PACKING

CROSS REFERENCE TO RELATED APPLICATION

Figure 1:
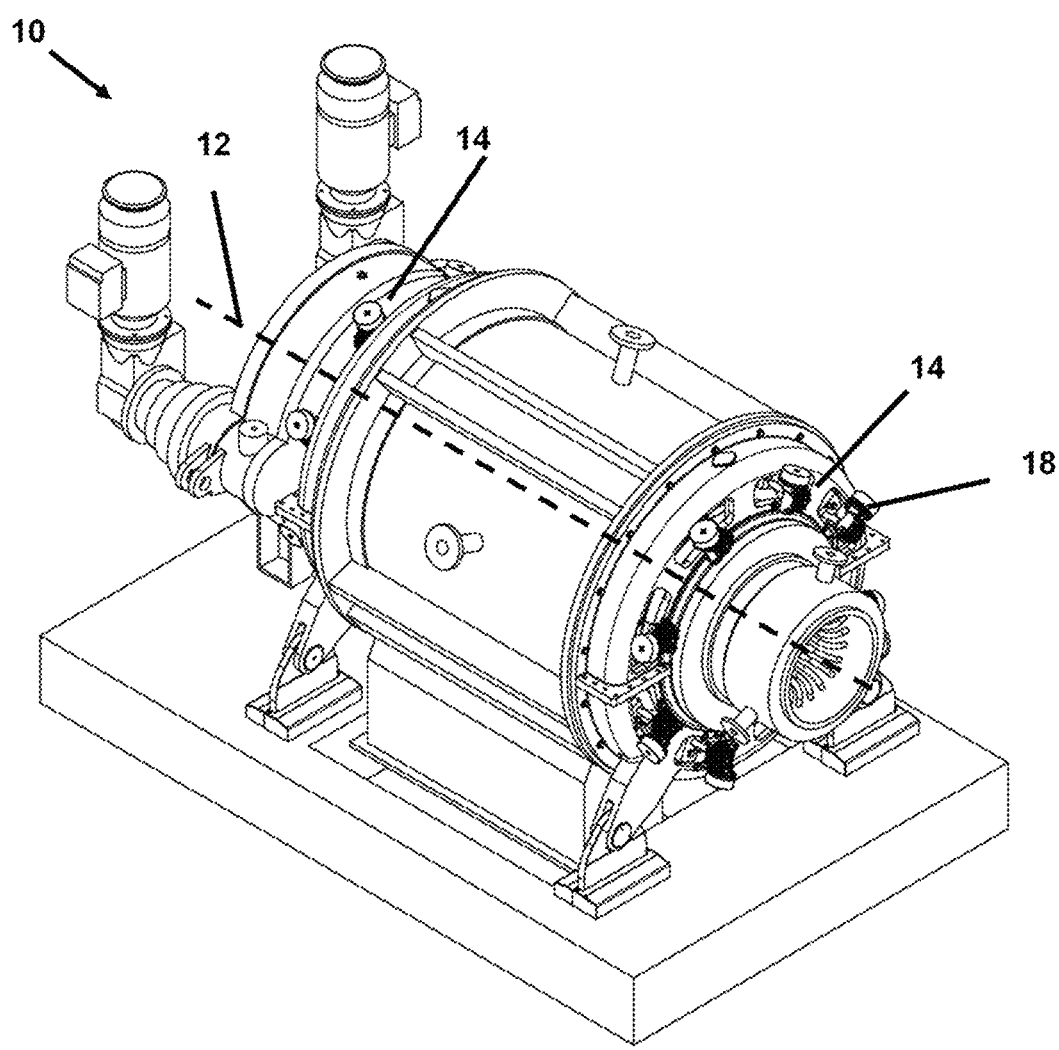

This application is a U.S. national phase of International Patent Application No. PCT/EP2021/078163 filed on Oct. 12, 2021, the entire contents of which are hereby incorporated herein by this reference.

The invention relates to a device for tensioning a stuffing box packing which abuts against a superordinate assembly which is to be sealed by the stuffing box packing and which, such as the stuffing box packing, does not belong to the tensioning device, in particular for tensioning the stuffing box packing of a rotary pressure filter, comprising a stuffing box gland, which is designed and intended to abut against a free side of the stuffing box packing, and a plurality of tensioning elements, which are designed and intended to press the stuffing box gland against the stuffing box packing and thus the stuffing box packing against the superordinate assembly.

Stuffing box packings are generally used in superordinate assemblies in order to seal a movable element of the superordinate assembly during operation of the superordinate assembly against a stationary element of the superordinate assembly during operation of the superordinate assembly.

For example, the applicant has been selling rotary pressure filters for many years. In such rotary pressure filters, the process chambers which are subjected to overpressure are usually sealed from the environment by a stuffing box packing between the rotating filter drum and the stationary filter housing. In order to reliably ensure sealing even after a long operating period, the stuffing box packing must be retensioned at regular intervals, in particular due to the decreasing elasticity of the stuffing box packing material and wear of the stuffing box packing on the sliding surface to the filter drum. The result of the retensioning and thus the quality of the seal is highly dependent on the experience and careful working methods of the operating personnel.

The tensioning elements of the stuffing box packing are often only retightened at those points on the circumference where leakage has been detected, and not, in accordance with the operating instructions, at all tensioning elements with the same distance. This may cause the stuffing box gland to tilt and, in the worst case, to damage surface of the filter drum.

In order to solve these problems, the applicant proposed an embodiment in DE 10 2017 221 088 A1 in which all tensioning elements are connected in a torque-transmitting manner, for example by means of a chain, in such a way that a rotation of one of the tensioning elements also forcibly causes a rotation of the other tensioning elements. Even if this embodiment has proven itself in practice, there have frequently been situations in which individual tensioning of individual tensioning elements would have been advantageous.

The object of the invention is to provide a solution for this.

According to the invention, this object is achieved by a tensioning device of the type mentioned at the beginning, in which each of the tensioning elements is associated with a separate motor drive unit. In this way, the tensioning elements may be actuated jointly or individually. It is also possible to specifically actuate only a subgroup of tensioning elements.

Depending on the specific parameters of the individual case, in particular the size of the superordinate assembly, between three and eight tensioning elements may be provided, for example. However, it is also conceivable to provide more than eight tensioning elements.

Advantageously, it may be provided that at least one motor drive unit, preferably all motor drive units, comprises a fluidically drivable motor drive unit, for example a pneumatically drivable motor drive unit, preferably a pneumatically operable radial piston motor.

Fluidically drivable motor drive units have the advantage that a supply for at least one operating fluid is usually available at the location of the superordinate assembly anyway. In particular, pneumatically operable radial piston motors have the advantage of being able to provide a high torque, especially at low speeds.

In order to be able to finely control the movement of the tensioning elements, it is also proposed that at least one motor drive unit, preferably all motor drive units, comprise a reduction gear, for example a worm gear. In this context, worm gears have the advantage of being self-locking. Therefore, no additional precautions need to be taken in order to prevent the associated tensioning element from being unintentionally released again after the fluidically drivable motor drive unit has been turned off.

The combination of a worm gear with a pneumatically operable radial piston motor is particularly advantageous as it ensures that the breakaway torque of the self-locking of the worm gear may be reliably overcome by the pneumatically operable radial piston motor.

In a further development of the invention, it is proposed that the worm of the worm gear unit, which is connected to the fluidically drivable motor drive unit on the input side, is in reduction engagement on the output side with an axially fixed spline element of the worm gear, and that the spline element is in threaded engagement with a tensioning element which is axially displaceable but rotatably arranged.

For example, the tensioning element may have an external thread that is in threaded engagement with the internal thread of a hollow rod which is provided with an internal thread.

The spline element may be designed with a tool engagement profile at its free end, i.e. the end facing away from the tensioning element, in order to be able to retension the stuffing box packing manually, for example if the fluid supply fails. The tool engagement profile may be a hexagonal profile, for example.

In order to be able to absorb the torques resulting from a relative movement between the movable element and the stationary element of the superordinate assembly and thus a relative movement between the stuffing box packing and the stuffing box gland, it may be provided that the stuffing box gland or an element connected to it has at least one axial through-opening in which an axial plain bearing is accommodated, which is designed and intended to come into sliding engagement with an associated guide pin attached to the superordinate assembly. In this way, these torques may be kept away from the tensioning elements, which can thus be designed exclusively for tensioning the stuffing box gland. Preferably, a plurality of such axial through-openings may be provided.

Furthermore, the weight force of the drive unit may be transmitted to the stationary element of the superordinate assembly by means of a section of the spline element, for example of cylindrical design, which is rotatably mounted in a through-opening of a bearing pedestal, and this bearing pedestal to the stationary element of the superordinate assembly. In this way, the connection of the drive unit to a cover element covering the stuffing box seal only needs to take out the torque generated by the operation of the drive unit.

In a further development of the invention, it is proposed that the stuffing box gland has a substantially rectangular cross-sectional area in a section taken orthogonal to its longitudinal extension. In this way, the force from the spline element may be introduced into the stuffing box gland by means of the tensioning element in a substantially straight line. The longitudinal extension of the stuffing box gland may run in the circumferential direction, as is the case with a rotary pressure filter, for example.

In order to increase the rigidity of the stuffing box gland, it is proposed that the long side of the rectangle is at least three times as long as the short side of the rectangle.

In order to be able to assemble and disassemble the stuffing box gland more easily, it may be provided that the stuffing box gland is divided into a plurality of segments. Advantageously, a separate segment may be provided for each tensioning element. In principle, however, it is also conceivable that two or more tensioning elements are associated with at least one segment. The number of segments can, for example, be selected in such a way that the individual segments are easy to handle in terms of size and/or weight.

In order to nevertheless be able to provide an overall rigid stuffing box gland, it is proposed in a further development of the invention that the free ends of two mutually adjacent segments are designed to interlock in a positive-locking manner. This design may increase the rigidity of the stuffing box gland, since forces exerted on the segment by a tensioning element, for example acting centrally on the segment, may also be transmitted to the respective adjacent segments by means of the positive locking and these adjacent segments thus counteract deformation of the segment in question.

Furthermore, it may be provided that the positive locking acts in at least two, preferably all three of the directions axial direction, radial direction and circumferential direction.

In addition or as an alternative to the positive locking, it may be provided that the free ends of at least two mutually adjacent segments are connected to each other by means of at least one radially running screw and/or that the free ends of at least two mutually adjacent segments are connected to each other by means of a coupling element that abuts axially on the segments. The rigidity of the stuffing box gland may also be further increased by these further developments. When a coupling element is used, it may have the through-opening with the axial plain bearing for the guide pin.

In a further development of the invention, it is further proposed that at least one distance sensor, which is designed and intended to detect the distance of the stuffing box gland from the superordinate assembly, is arranged at at least three points distributed over the circumference of the stuffing box gland.

In addition, at least one pressure sensor may be provided, which is designed and intended to detect the pressure at which the drive fluid is supplied. Since the area with which the tensioning elements press against the stuffing box gland is constant, this pressure is proportional to the force with which the tensioning elements press against the stuffing box gland. The comparison of this force with the displacement caused by it may allow conclusions to be drawn about the condition of the stuffing box packing if the process pressure in the process chamber of the superordinate assembly is known. This makes it possible to always press the tensioning elements against the stuffing box gland with the exact force required to ensure that the process chamber is sealed. This prevents overstraining of the stuffing box packing and thus its premature wear.

In order to realize the above-mentioned control of the tensioning elements or the fluidically drivable motor drive units associated with them, the tensioning device may also comprise a valve arrangement which is designed and intended to supply drive fluid to the plurality of fluidically drivable motor drive units or to discharge drive fluid from them again. In particular, a separate valve unit may be associated with each fluidically drivable motor drive unit.

For example, the valve arrangement of at least one valve unit may comprise a 5/3-way valve.

In a further development of the invention, a control unit may also be provided, which is designed and intended to control the valve units jointly in a first operating mode in the sense of a drive fluid supply or discharge, and to control the valve units individually or in subgroups in the sense of a drive fluid supply or discharge in a second operating mode. The first operating mode may be used, for example, when the stuffing box gland needs to be applied against the stuffing box packing with uniform force during initial assembly or after changing the stuffing box packing. In a first phase of the positioning movement, comparatively large distances may be covered, even when pneumatically drivable rotary piston motors are used, as comparatively low torques are sufficient for the mere movement of the stuffing box gland. In a second phase, the stuffing box gland may then be pressed against the stuffing box packing with a predetermined force. Here, smaller distances are covered per unit of time, so that even when pneumatically drivable rotary piston motors are used, comparatively high torques and thus pressing forces are available. If the fluid pressure is no longer sufficient for a particular drive unit to continue rotating, it simply stops. This ensures that the stuffing box gland abuts on the entire stuffing box packing with the same force. The second operating mode may then be used to adapt the stuffing box gland to the conditions of the stuffing box packing, depending on the measurement result of the distance sensors, by further actuating individual tensioning elements or at least one group of tensioning elements.

If a separate valve unit is associated with each drive unit, the groups may be formed dynamically. However, it is also conceivable to predefine the groups statically and thus save costs for valve units.

Figure 2:
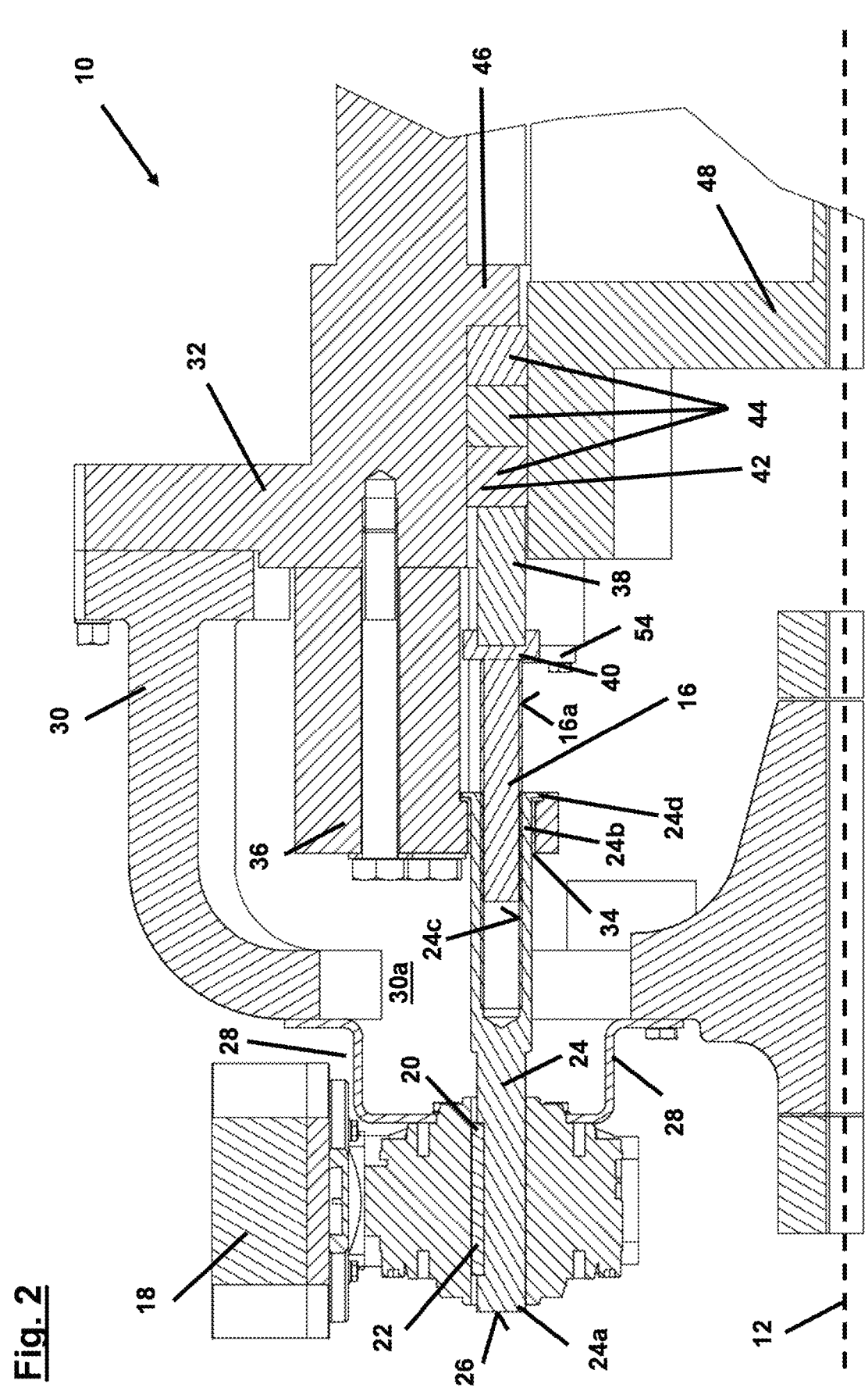
Figure 6:
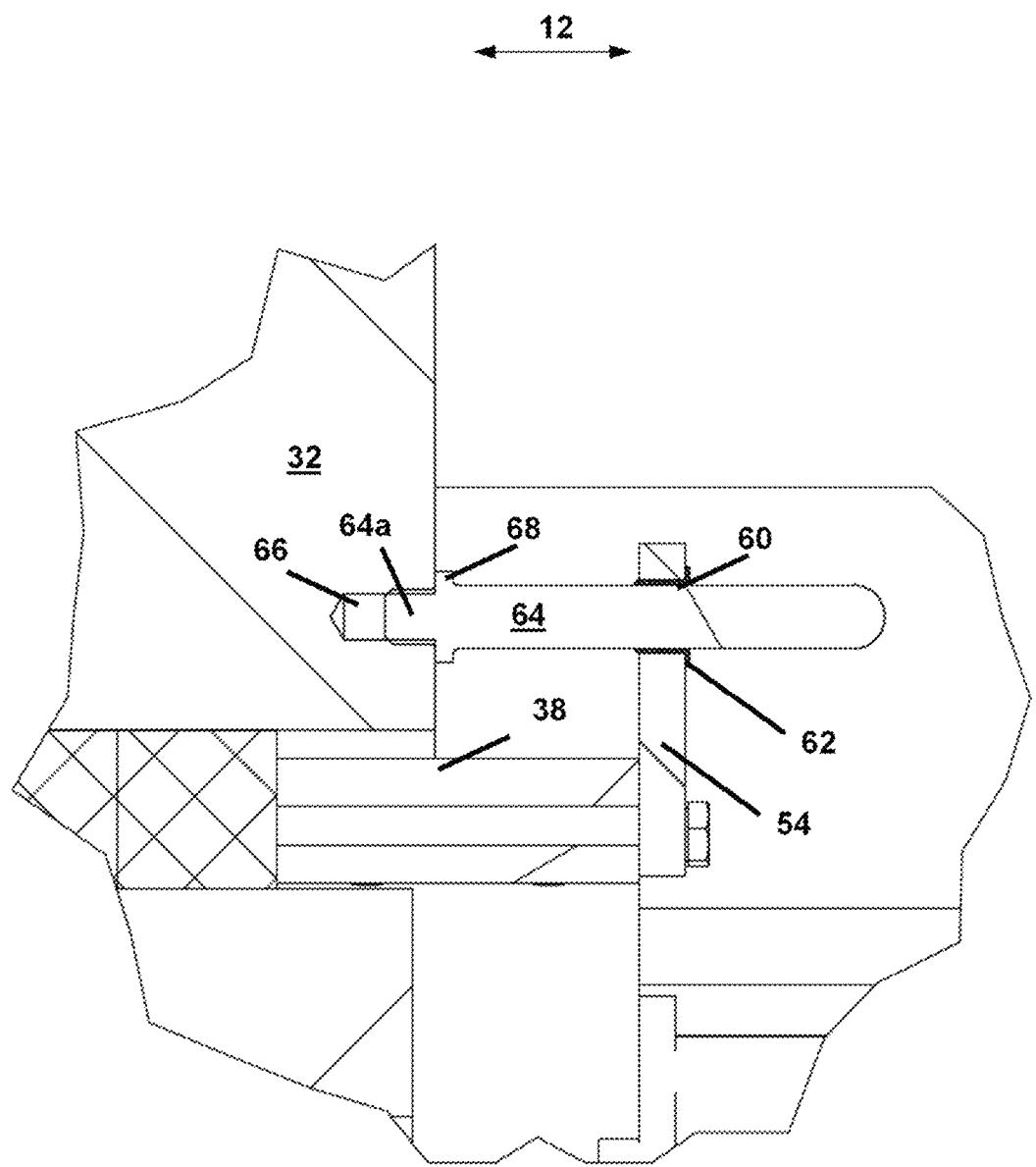
Figure 7:
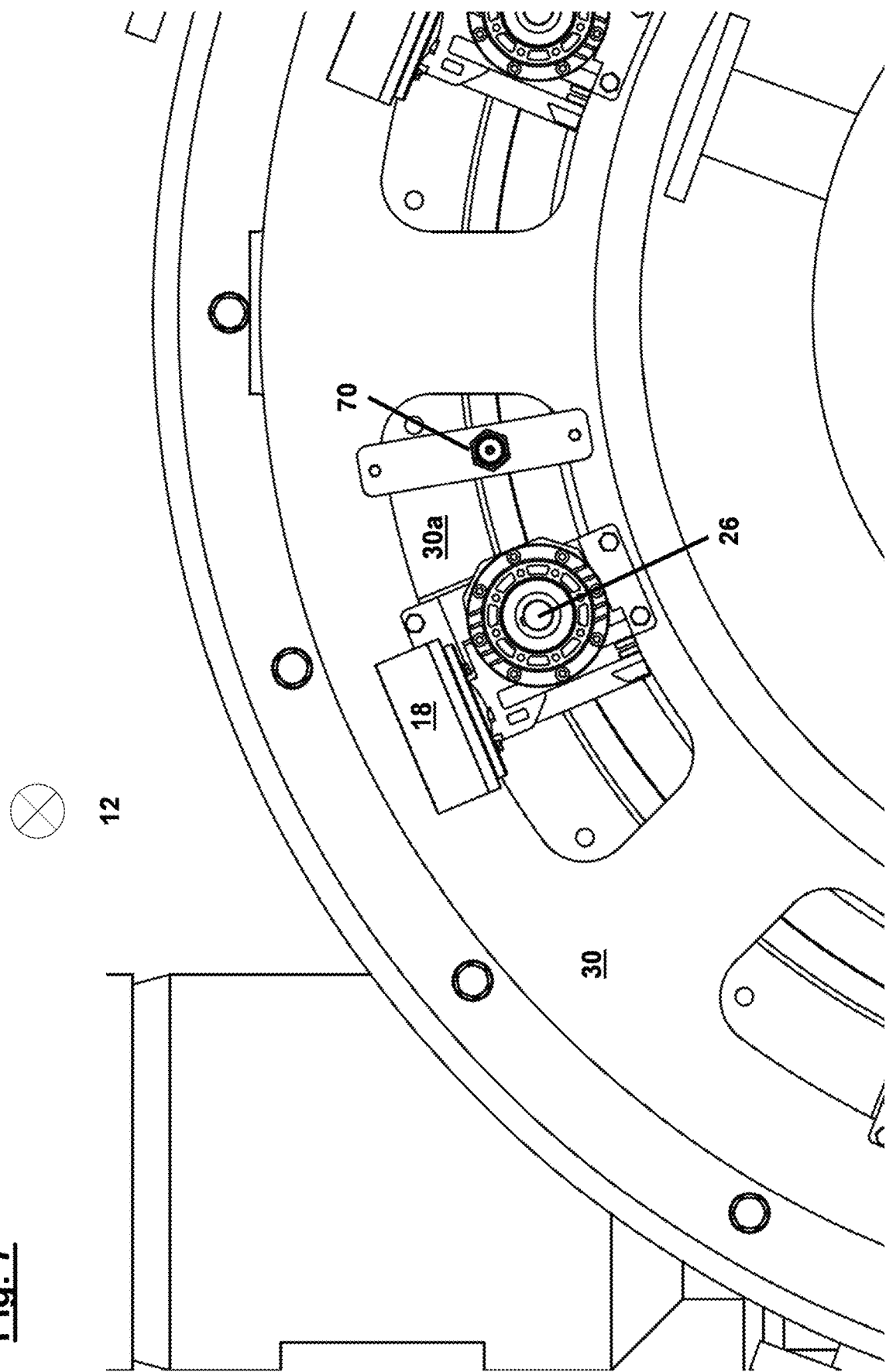
Figure 8:
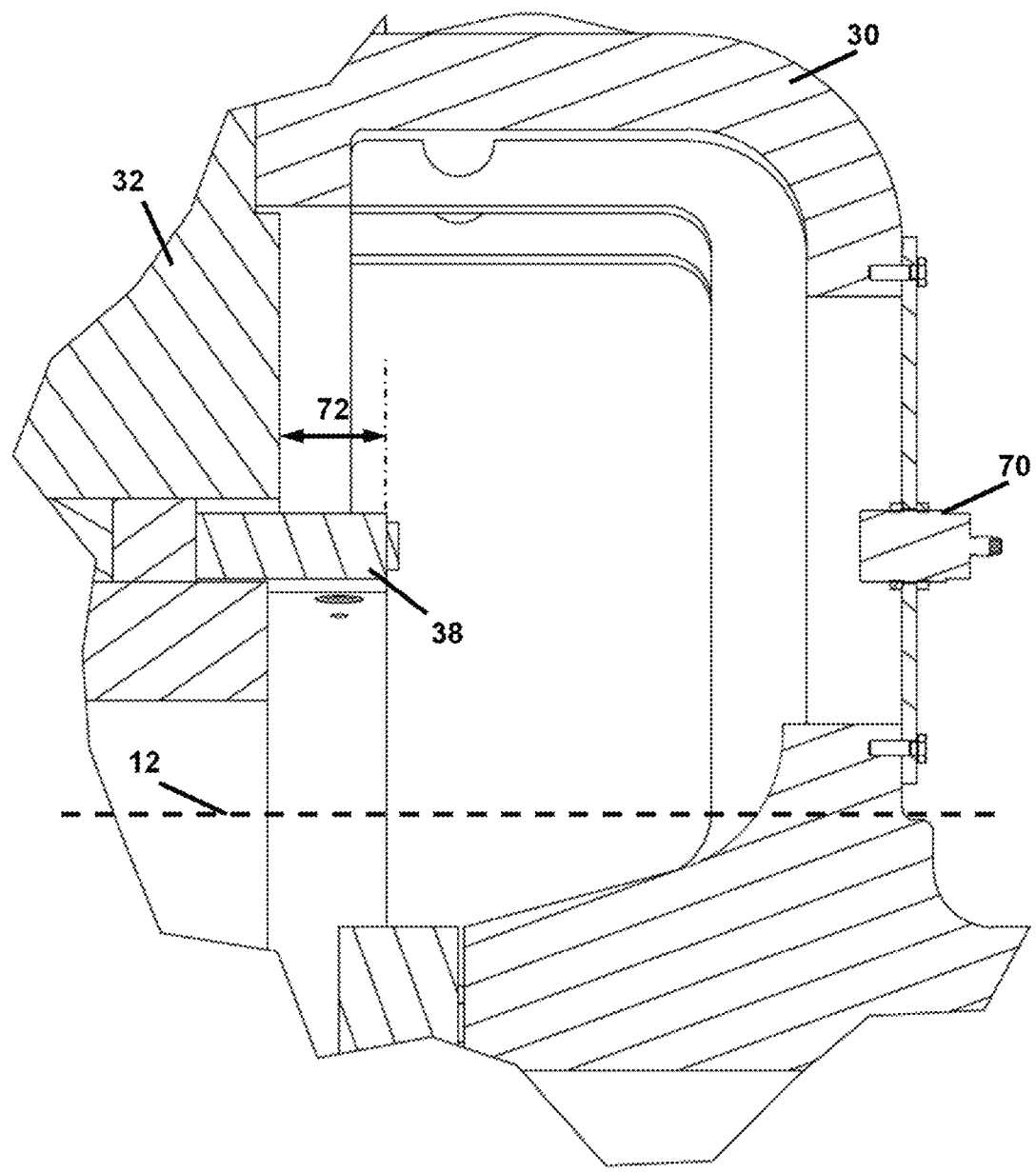
Figure 9:
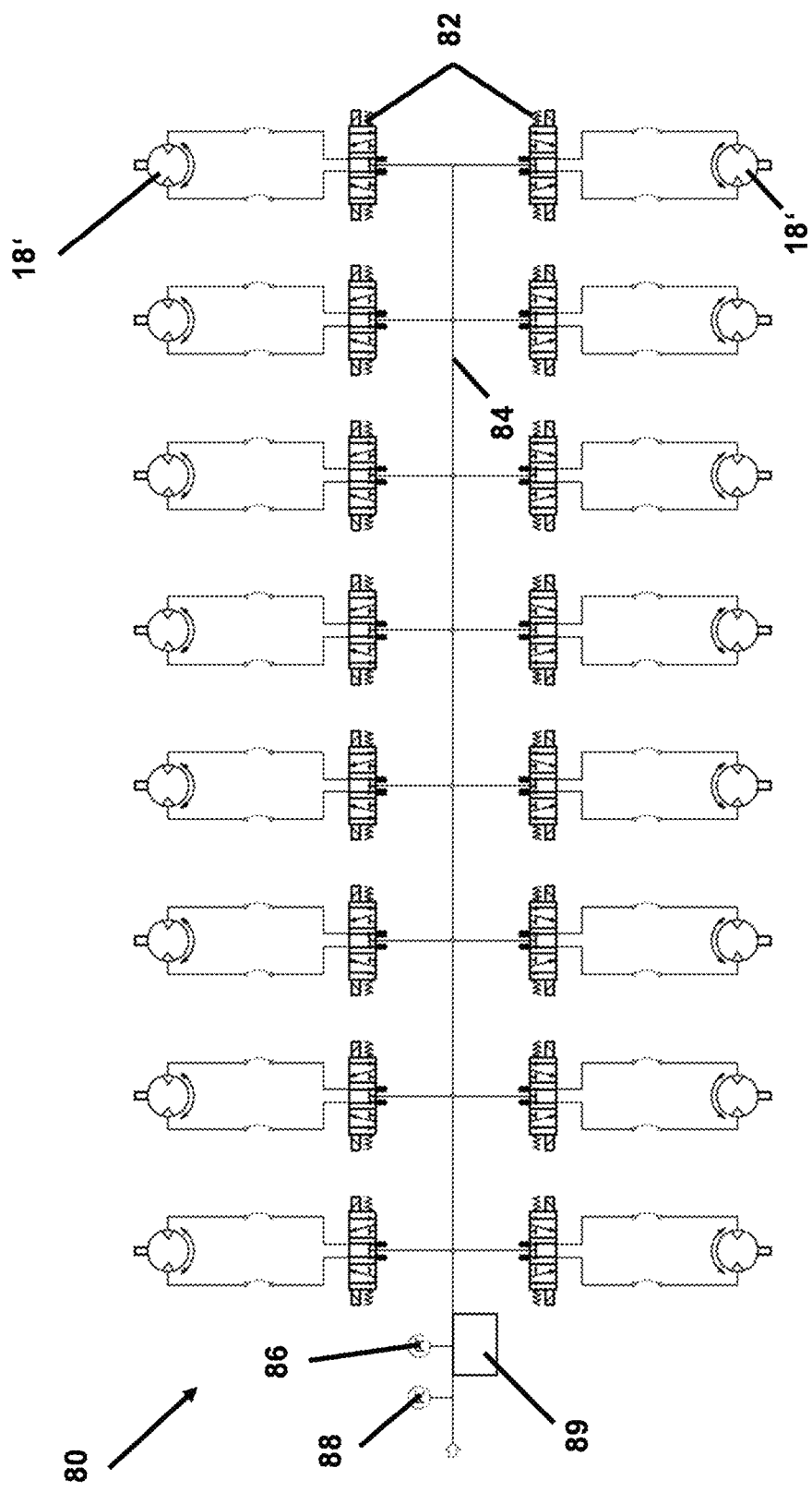
Figure 10:
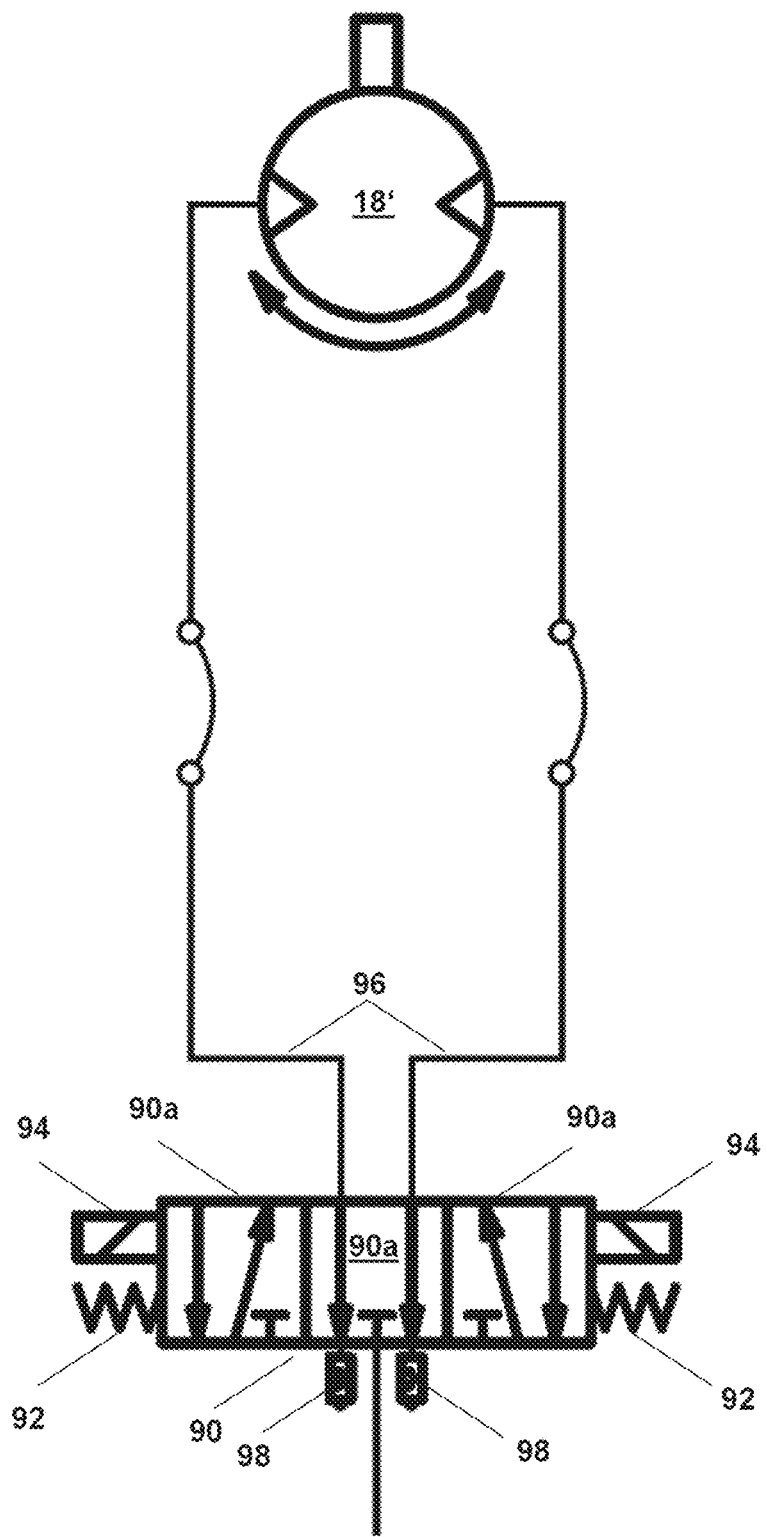

Embodiments according to the invention are described in more detail below by way of example and with reference to the following drawings, which show:

FIG. 1 a perspective view of a rotary pressure filter equipped with an embodiment of the device according to the invention;

FIG. 2 a side cross-section of a section of the rotary pressure filter and the device according to the invention as shown in FIG. 1;

FIG. 3 a front view of a stuffing box gland according to the invention viewed in the axial direction;

FIG. 4 an enlarged view of detail IV of the stuffing box gland as shown in FIG. 3;

FIG. 5 the detail IV of the stuffing box gland as shown in FIG. 4, but seen in the radial direction;

FIG. 6 a side cross-section of a guide pin of the stuffing box gland;

FIG. 7 a frontal view of a section of a rotary pressure filter according to the invention;

FIG. 8 a side cross-section illustrating the structure and function of a distance sensor;

FIG. 9 a schematic representation of a valve arrangement according to the invention;

FIG. 10 an enlarged schematic representation of a motor drive unit according to the invention with a valve unit as shown in FIG. 9.

In FIGS. 1 and 2, a rotary pressure filter is generally designated with reference sign 10 as an example of a superordinate assembly. Along a longitudinal axis 12, which describes the axial direction, a device 14 according to the invention for tensioning a stuffing box packing 42 is installed at a front end and at a rear end of the rotary pressure filter 10. A radial direction 13 runs orthogonally to the longitudinal axis 12 (see FIG. 4). Each of the tensioning devices 14 comprises a plurality of tensioning elements 16. A separate fluidically drivable motor drive unit 18 is associated with each of the tensioning elements 16. The motor drive unit 18 can, for example, be a pneumatically operable radial piston motor.

With reference to FIG. 2, a reduction gear 20, for example a worm gear, is connected to the motor drive unit 18. A worm (not shown) is in reduction engagement with an axially fixed spline element 24 and forms the worm gear 20 with this. The spline element 24 is essentially cylindrical with the spline pointing radially outwards.

A tool engagement profile 26 is formed at a free end 24a of the spline element 24, i.e. an end located further outwards axially. This tool engagement profile 26 may be designed as a hexagonal profile, for example.

The motor drive unit 18 is supported by means of holders 28 on a cover element 30, which in turn is attached to a stationary element 32 of the rotary pressure filter 10, for example by screws, rivets, adhesives and the like. On the one hand, these holders 28 prevent the drive unit 18 from rotating about the longitudinal axis of the spline element 24 and on the other hand, also prevent the worm 22 and the spline element 24 from slipping axially. A cover opening 30a is provided in the cover element 30, through which the spline element 24 projects into the cover element.

At its axially further inward end section 24b, the spline element 24 is designed as a hollow rod and is in threaded engagement with the tensioning element 16. For this purpose, the spline element 24 has an internal thread 24c and the tensioning element 16 is provided with an external thread 16a, which is in threaded engagement with the internal thread 28c of the spline element 24. This allows the tensioning element 16 to be axially displaceable.

The spline element 24 is guided through a through-opening 34 of a stabilizing element 36 at the axially further inward end section 24b. A bearing is provided in the through-opening 34, which is designed and intended to support a rotational movement of the spline element 24. The stabilizing element 36 is connected to the stationary element 32 of the rotary pressure filter 10 in an operationally fixed manner, for example by screws, rivets, adhesives and the like.

Axial movement of the spline element 24 outwards in the axial direction may be avoided by the spline element 24 having a radial shoulder 24d at its axially further inward end, which abuts on the stabilizing element 36.

At its end which is opposite to the internal thread 16a, the tensioning element 16 abuts on the stuffing box gland 38 with a receptacle 40. The interaction of the receptacle 40 with the stuffing box gland 38 also prevents the tensioning element 16 from rotating when the spline element 24 is rotated and thus produces a positioning movement of the tensioning element 16 against the stuffing box gland 38.

The stuffing box gland 38 is arranged in such a way that it presses against a stuffing box packing 42, which in this case comprises several stuffing box packing rings 44. On its side facing away from the stuffing box gland 38, the stuffing box packing 42 abuts on a radially inward-facing shoulder 46 of the stationary element 32 of the rotary pressure filter 10. On its radially outer side, the stuffing box packing 42 abuts on the stationary element 32 of the rotary pressure filter 10. And on its radially inner side, the stuffing box packing 42 abuts on a movable element 48 of the rotary pressure filter 10.

In a section taken orthogonal to its longitudinal extension, as shown in FIG. 2, the stuffing box gland 38 has a substantially rectangular cross section. In the embodiment shown in FIG. 2, the long side of the rectangle extends in the axial direction and is approximately three times as long as the short side of the rectangle.

The procedure for tensioning the stuffing box packing 42 is as follows. The motor drive unit 18 rotates the spline element 24 by means of the worm gear 20. Due to the fact that the internal thread 24c of the spline element 24 is in engagement with the external thread 16a of the tensioning element 16 and the receptacle 40 interacts with the stuffing box gland 38, the rotational movement of the spline element 24 is transferred to the tensioning element 16 in such a way that the latter is retracted and/or extended in the axial direction. The axial movement of the tensioning element 16 causes an analogous axial movement of the stuffing box gland 38. When the stuffing box gland 38 moves axially in the direction of the stuffing box packing shoulder 46, the stuffing box packing 42 is pressed against the stuffing box packing shoulder 46 and expands in radial direction. In this way, the stuffing box packing 42 seals the stationary element 32 and the movable element 48 at its sliding surface. It goes without saying that the rotation direction of the spline element 24 only needs to be reversed in order to release the stuffing box packing 42.

With reference to FIGS. 3 to 5, the stuffing box gland 38 is substantially ring-shaped, wherein it may have a plurality of interconnected segments 38a (see FIG. 3) or 38b, 38c (see FIGS. 4 and 5). Two mutually adjacent segments are connected to each other at connecting sections 50.

The detailed view in FIG. 4 shows how a first segment 38b interlocks with a second segment 38c. For this purpose, the first segment 38b has a recessed end section 38d at a first end. Adjacent to the recessed end section 38d, the first segment 38b is provided with a recess 38e. The adjacent (second) end of the second segment 38c is designed correspondingly complementary to the first end of the first segment 38b, so that a positive-locking connection is formed at least in the radial and circumferential direction. For example, the recessed end section 38d and the recess 38e of the first segment 38b may be recessed radially outwards and the second segment 38c may be formed with a corresponding contour radially inwards.

Furthermore, a coupling element 52 is provided on the connecting section 50, which abuts axially on the adjacent segments 38b, 38c. This coupling element 52 abuts on the segments 38b, 38c and connects the first segment 38b and the second segment 38c to one another. For this purpose, the coupling element 52 is fastened, for example screwed, to the adjacent segments 38a by means of fastening elements 54.

As can be seen from FIG. 5, the two adjacent segments 38b, 38c are also connected to each other by means of radially running screws 56. The screws 56 may run through the recess 38e of one segment and the recessed end section 38d of the adjacent segment. In order to further increase stabilization, two screws 56 may run from radially outward to radially inward, and two screws 56 of the same connecting section 50 may run in the opposite direction.

According to FIG. 6, the coupling element 52 is also provided with an axial through-opening 60. An axial plain bearing 62 is accommodated in this axial through-opening 60, through which a guide pin 64 passes. The guide pin 64 is not only connected to the stuffing box gland 38 by means of the coupling element 52 but is also attached to the superordinate assembly 10 by means of the stationary element 32. For this purpose, the stationary element 32 has a threaded hole 66 into which an end section 64a of the guide pin 64 is screwed. The guide pin 64 is provided with a projection 68 at a section adjacent to the end section 64a, which abuts on the stationary element 32. The stuffing box gland 38 may be supported in the circumferential direction by means of the guide pin 64, so that such movement components cannot have any detrimental effect on the function of the tensioning device, in particular the tensioning elements 16.

Furthermore, a device 14 according to the invention may be provided with a distance sensor 70 (see FIG. 7). The distance sensor 70 can, for example, be attached to the cover element 30 in an operationally fixed manner, so that it detects a distance of the stuffing box gland 38 from the superordinate assembly 10 through the cover opening 30a. This may be, for example, a distance 72 (see FIG. 8) between the axially outer end of the stuffing box gland 38 and the axially outer surface of the movable element 48. In this way, an inclined position of the stuffing box gland 38 may be detected.

FIG. 9 shows a schematic representation of a valve arrangement 80 according to the invention, with which motor drive units 18' are controlled in order to retighten the tensioning elements 16 of the stuffing box packing 42.

The number of motor drive units 18' corresponds to the number of tensioning elements 16. In the exemplary embodiments shown in FIG. 1, a device 14 according to the invention with eight tensioning elements 16 respectively is provided at the front and rear ends of the rotary pressure filter 10 as viewed in the axial direction. However, it goes without saying that the invention is not limited to this number.

The valve arrangement 80 is designed and intended to supply a drive fluid F to the fluidically drivable drive units 18' or to discharge it again from these. A valve unit 82 is associated with each fluidically drivable drive unit 18' for this purpose. The drive fluid F is supplied to the valve units 82 by means of a line system 84 and discharged from them again.

The pressure with which the drive fluid F is supplied to the valve units 82 may be detected by means of a pressure sensor 86. Furthermore, an electrically controlled pressure reducer 88 may be provided which, depending on the pressure sensor 86, keeps the pressure in the line system 84 below a predefined maximum pressure.

Furthermore, a control unit 89 may be provided, which has at least two operating modes. In a first operating mode, the control unit 89 controls the valve units 82 jointly in the sense of a drive fluid supply or discharge. In a second operating mode, the valve units 82 are controlled individually or in subgroups in the sense of a drive fluid supply or discharge.

According to the invention, a valve unit 82 may be associated with each fluidically drivable motor drive unit 18'. FIG. 10 shows such a combination of a fluidically drivable motor drive unit 18' with a valve unit 82 in neutral center position.

The valve unit 82 comprises a 5/3-way valve of known design and known function.

In the neutral center position of the valve unit 82, no drive fluid F is supplied to the motor drive unit 18', so that the motor drive unit 18' does not generate any input or output power.

The associated tensioning element 16 remains in its set position.

If the valve unit 82 is moved to one of the other two positions, drive fluid F may be supplied to the motor drive unit 18' by means of a line 90. This causes the motor drive unit 18' to rotate clockwise or counterclockwise. The rotation of the motor drive unit 18' may be reversed by changing the position of the valve unit 82 and the associated change in the flow direction of the drive fluid F.

Depending on the position of the valve unit 82, the motor drive unit 18' therefore generates an input force or an output force. The associated tensioning element 16 is thereby tightened and thus the stuffing box packing 42 is pressed against the superordinate assembly 10 or the tensioning element 16 is removed from the stuffing box packing 42 and thus loosened.

Depending on the position of the valve unit 82, at least one line 90 is vented into a shock absorber 92. In the present context, the term "venting" describes the discharge of the drive fluid F from the drive unit 18' by means of the line 90 connected thereto. The drive fluid F may be air, nitrogen and the like.

The invention claimed is:

1. A device for tensioning a stuffing box packing which abuts against a superordinate assembly which is to be sealed by the stuffing box packing and which, like the stuffing box packing, does not belong to the tensioning device, the device comprising:
    a stuffing box gland, which is designed and intended to abut against a free side of the stuffing box packing; and
    a plurality of tensioning elements which are designed and intended to press the stuffing box gland against the stuffing box packing and thus the stuffing box packing against the superordinate assembly,
wherein a separate motor drive unit is associated with each of the tensioning elements, and
wherein at least one of the motor drive units comprises a reduction gear.

2. The device according to claim 1,
    wherein at least one of the motor drive units comprises a fluidically drivable motor drive unit.

3. The device according to claim 1,
    wherein the reduction gear is a worm gear that is connected to the motor drive unit on an input side, where a worm of the worm gear is in reduction engagement on an output side with an axially fixed spline element of the worm gear, and where the spline element is in threaded engagement with a tensioning element of the plurality of tensioning elements that is axially displaceable but rotatably arranged.

4. The device according to claim 3,
    wherein the spline element is formed with a tool engagement profile at its free end,
    wherein the free end is an end facing away from the tensioning element.

5. The device according to claim 1,
    wherein the stuffing box gland or an element connected to it has at least one axial through-opening, in which an axial plain bearing is accommodated, which is designed and intended to come into sliding engagement with an associated guide pin attached to the superordinate assembly.

6. The device according to claim 1, wherein the stuffing box gland has a substantially rectangular cross-sectional area in a section taken orthogonal to its longitudinal extension.

7. The device according to claim 6, wherein a long side of the rectangular cross-sectional area is at least three times as long as a short side of the rectangular cross-sectional area.

8. The device according to claim 1, wherein the stuffing box gland is divided into a plurality of segments.

9. The device according to claim 8, wherein free ends of two mutually adjacent segments are designed to interlock in a positive-locking manner.

10. The device according to claim 9, wherein the positive locking acts in at least two of an axial direction, a radial direction and a circumferential direction.

11. The device according to claim 1, wherein free ends of at least two mutually adjacent segments are connected to one another by means of at least one radially running screw, and/or the free ends of at least two mutually adjacent segments are connected to one another by means of a coupling element abutting axially on the segments.

12. The device according to claim 1, wherein at least one distance sensor, which is designed and intended to detect a distance of the stuffing box gland from the superordinate assembly, is arranged in each case at at least three points distributed over a circumference of the stuffing box gland.

13. The device according to claim 1, wherein at least one pressure sensor is provided, which is designed and intended to detect a pressure at which drive fluid is supplied.

14. The device according to claim 1, wherein the device further comprises a valve arrangement which is designed and intended to supply drive fluid to the motor drive units or to discharge drive fluid from them again.

15. The device according to claim 14, wherein a separate valve unit is associated with each motor drive unit.

16. The device according to claim 15, wherein at least one valve unit comprises a 5/3-way valve.

17. The device according to claim 14, wherein a control unit is provided, which is designed and intended to control the valve units jointly in a first operating mode in the sense of a drive fluid supply or discharge, and in a second operating mode to control the valve units individually or in subgroups in the sense of a drive fluid supply or discharge.

18. The device according to claim 2, wherein the fluidically drivable motor drive unit is a pneumatically drivable motor drive unit.

19. The device according to claim 2, wherein the fluidically drivable motor drive unit is a pneumatically operable radial piston motor.

* * * * *